United States Patent [19]

Dyer

[11] Patent Number: 4,839,489
[45] Date of Patent: Jun. 13, 1989

[54] TRAILER SHIELD ASSEMBLY FOR A WELDING TORCH

[75] Inventor: Gerald E. Dyer, Canoga Park, Calif.

[73] Assignee: The United States of America as represented by the Administrator of the National Aeronautics and Space Administration, Washington, D.C.

[21] Appl. No.: 156,059

[22] Filed: Feb. 16, 1988

[51] Int. Cl.⁴ ............................................. B23K 9/16
[52] U.S. Cl. ....................................... 219/74; 219/72
[58] Field of Search ...................... 219/74, 70, 72, 122

[56] References Cited

U.S. PATENT DOCUMENTS 2,856,510 10/1958 Jones et al. .
2,860,074 12/1958 Ronay .
2,902,587 9/1959 Bernard .
2,918,563 12/1959 Ternisien .
2,959,666 11/1960 Tuthill .
3,450,857 6/1969 Webb .
4,005,305 1/1977 Nelson .

Primary Examiner—E. A. Goldberg
Assistant Examiner—Lincoln Donovan
Attorney, Agent, or Firm—William J. Sheehan; John R. Manning; Charles E. B. Glenn

[57] ABSTRACT

A trailer shield assembly (10) having a housing (24) with an open lower side and a welding torch (12) mounted so that a welding tip portion (48) of the torch (12) extends through the lower side of the housing (24). A flexible gas guide (76) is affixed to a rear wall (74) of the housing (24) and has an interior (116) in communicating relation with a welding region (34) of the housing (24). A flexible shield gas manifold (90) having a plurality of spaced openings (92) therein is disposed in an upper region (110) of the gas guide (76) and is connectible to a source (11) of shield gas. A diffuser (112) surrounds the flexible manifold and serves to distribute shield gas in an even layer downwardly to cover a hot weld. A pair of openings (96) in the flexible manifold (90) communicates with a second gas manifold (32) disposed in an upper region of the housing (24), with this second gas manifold (32) being provided with an aluminum gas diffuser (30). Diffuser (30) distributes shield gas ahead of torch (12) to cover metal preheated by this welding operation.

6 Claims, 3 Drawing Sheets

TRAILER SHIELD ASSEMBLY FOR A WELDING TORCH

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates generally to trailer shields for welding torches, and more particularly to a trailer shield which is in communicating relation with shield gas from a welding torch, with this trailer shield being connectible to a source of shield gas for establishing a positive pressure therein. Means are also provided for distributing shield gas ahead of the welding torch, protecting metal preheated thereby.

BACKGROUND OF THE INVENTION

Trailer shields for welding torches have been used in conjunction with gas shielded welding torches since it was discovered that during the welding process the metal being welded and the hot metal which was just welded reacted with atmospheric gases to weaken or otherwise adversely affect the weld. In use, a trailer shield is attached to the welding torch and is connected to a source of protective gas, such as argon, so that as the torch traverses and welds sections of metal to be joined, the trailer shield follows and covers the freshly welded hot metal with a protective blanket of argon, shielding the hot metal from atmospheric gases. This protection of the hot weld is crucial, as some important structural metals become embrittled or porous if heated beyond a certain temperature while being exposed to atmospheric gases. Titanium, for example, has a high affinity for all elements making up atmospheric gases at temperatures above 1,200° F. While being welded, molten titanium in the wake of the welding torch remains above 1,200° F. for a period of time while it cools from the molten state. If this molten titanium is exposed to atmospheric gases during this time, it becomes glass-like in brittleness, rendering the weld useless. Further, the extent of protection necessary to prevent contamination of the weld is also crucial, with concentrations of atmospheric gases down to 50 to 100 PPM (parts per million) being sufficient to contaminate a weld. Thus, a shield gas must be much denser and heavier (in addition to being non-reactive) than atmospheric gases in order to create an "envelope" around the welding operation and heated metal therefrom within which atmospheric gases are almost totally excluded. Accordingly, trailer shields have been developed for use with various contoured shapes of surfaces to be welded, such as pipes and other curved surfaces, flat surfaces, and surfaces having angled contours, such as when sections of flat plate are to be joined in angular relation. These trailer shields are constructed to closely fit the contours of surfaces to be welded in order to contain the "envelope" of shield gas to the welding operation itself and a region around the welding operation which is heated in excess of potentially damaging temperatures.

Problems with these trailer shields are that because they are rigid, a new trailer shield must be fabricated for each joint configuration or contour of the metals being joined. Further, the shield gas delivered by the trailer shield only covered a hot weld following the welding torch, with the gas from the torch covering the welding operation. Attempts have been made to overcome these problems, and U.S. Pat. No. 2,866,074 (Ronay), filed on Dec. 23, 1958, disclosed one such trailer shield. This trailer shield is constructed having a flexible, corrugated body which can be bent into a variety of configurations to cover various configuration of joints to be welded. This particular trailer shield is provided with a shield gas supply tube having a single outlet which provides shield gas to the interior of the trailer shield at a position nearest the welding torch. An outlet tube positioned at an opposite end of the trailer shield is coupled to a suction apparatus so that shield gas is drawn out of the trailer shield as it is put in. The trailer shield is provided with a clip so that the trailer shield may be clipped to a welding torch, with the torch being provided with a separate supply of shield gas.

Problems with the device disclosed in U.S. Pat. No. 2,866,074 are that shield gas from the welding torch is separated from the interior of the trailer shield, introducing the possibility of weld contamination because of a lack of continuity between shield gas from the torch and shield gas in the trailer shield. Another problem is that since shield gas is actively removed from the trailer shield, the possibility exists that a negative pressure may occur in the trailer shield, allowing atmospheric gases to be drawn into the interior of the trailer shield through clearances between the trailer shield and the welded metal, which could contaminate the weld.

Applicant's invention is directed to a trailer shield in which shield gas from the welding torch is not separated from the interior of the trailer shield. Also, no shielding gas is withdrawn from the present trailer shield, thus providing a slight positive pressure inside the shield and allowing a blanket of shielding gas to cover the weld.

Accordingly, it is an object of this invention to provide a flexible welding torch trailer shield which provides an even covering of shield gas to a hot weld. It is a further object of this invention to incorporate the end of the welding torch into the interior of a trailer shield, and yet another object of this invention is to distribute shield gas ahead of the welding torch to protect an area ahead of the welding torch which becomes preheated due to close proximity of the welding operation.

SUMMARY OF THE INVENTION

In accordance with this invention, a shield gas distributing apparatus is constructed having a housing with a welding torch being mounted in this housing and positioned such that a tip portion of the welding torch extends through a lower wall thereof. A flexible gas guide is attached to a rear wall of the housing and has an interior region in communicating relation with an interior welding region of the housing. Shield gas dispensing means coupled to a source of shield gas are provided in both the housing and the gas guide for dispensing an even layer of shield gas to metal heated by the welding process.

DESCRIPTION OF THE PREFERRED EMBODIMENT

Figure 1:
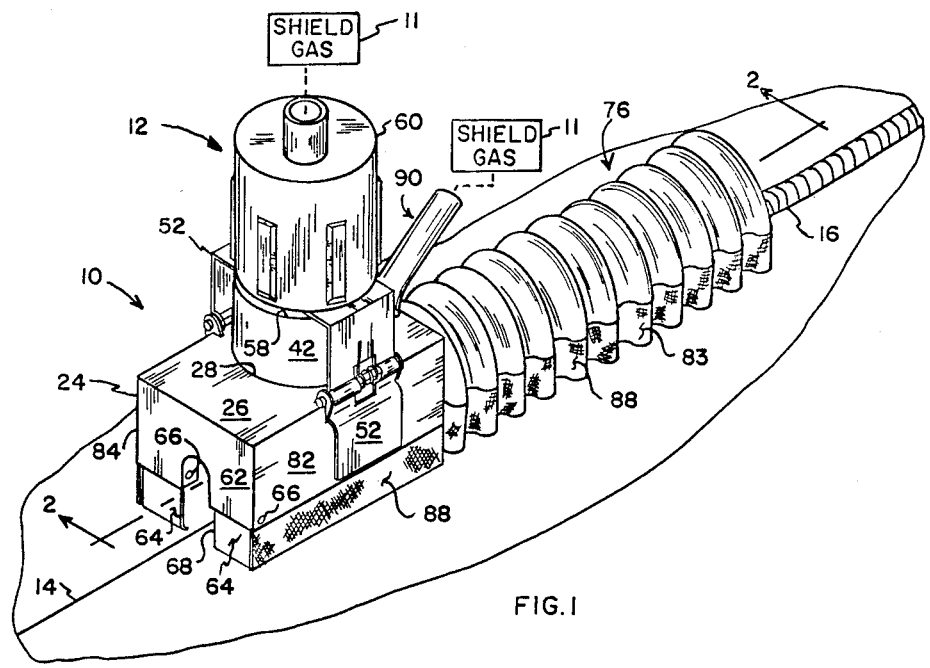
FIG. 1 is a pictorial view of a preferred embodiment of the present invention.
Figure 2:
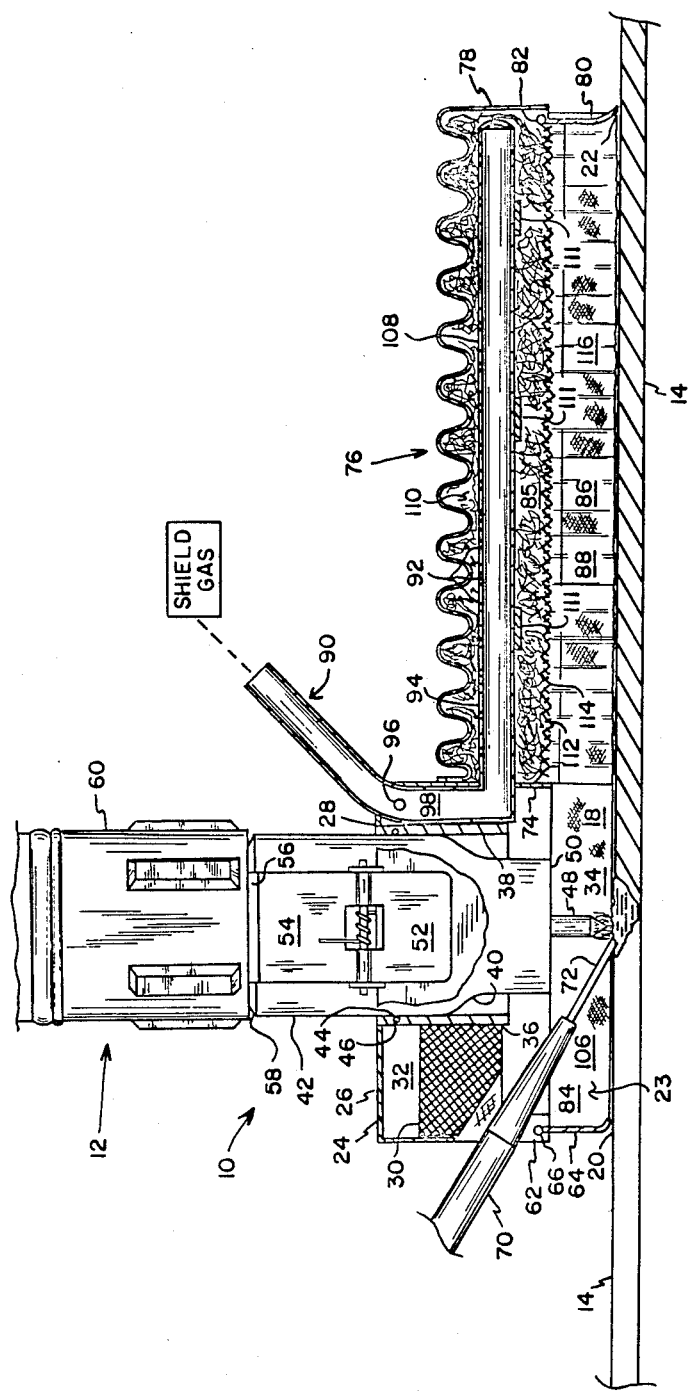
FIG. 2 is a sectional elevational view taken along line 2—2 of FIG. 1.
Figure 4:
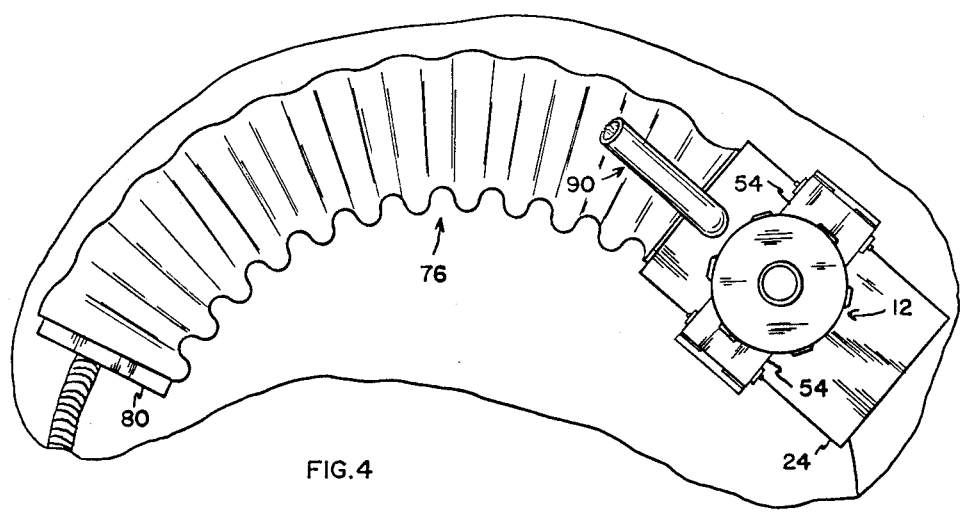
FIG. 4 is a pictorial view of an embodiment of the present invention showing a gas guide contoured to follow a circular seam of welded metal.

Referring to FIGS. 1 and 2, a trailer shield assembly 10 is shown which is fitted to a gas shielded welding torch 12, and which generally encloses a joint 14 being welded and a welded trailing portion 16 of hot welded metal. Trailer shield assembly 10 is coupled to a source 11 of denser and heavier-than-air shield gas, such as argon, which fills interior 18 (FIG. 2) of assembly 10 and thus covers joint 14 from point 20 to point 22, which is heated by the welding process, with shield gas.

Trailer shield assembly 10 is constructed having a rigid front housing 24 with an upper side 26 provided with an opening 28 which is disposed for mounting welding torch 12 therein. As shown in FIG. 2, a screen 30 horizontally divides interior 18 of housing 24 into an upper gas manifold region 32 and a welding region 34. Screen 30 has an opening 36 which is in aligned relation with upper opening 28 and is constructed having a tight mesh which maintains a positive pressure differential in upper gas manifold region 32. A sleeve 38 is sealably positioned between openings 28 and 36 and has an O-ring seal 44 which is set in a channel 46 around interior surface 40 of sleeve 38. O-ring seal 44 seals interior 18 of housing 24 from outside atmosphere. This is significant in that welding region 34 of housing 24 around an electrode 48 is supplied with shield gas from opening 50 in gas cup 42 of torch 12, which could have a venturi effect, drawing atmospheric gases through clearances between gas cup 42 and sleeve 38.

For latchably engaging torch 12 into sleeve 38, a pair of spring biased clips 52, each having an end 54 with a catch 56 disposed thereon, are mounted as shown on housing 24. Catches 56 engage a groove 58 between gas cup 42 and body 60 of torch 12, securely holding torch 12 in sleeve 38.

For providing torch 12 a region in which to operate and for enclosing welding region 34 by housing 24, an opposed, lower side 23 of housing 24 is open, with tip 13 of torch 12 extending below sides 82 and 84 of housing 24. A front side 62 of housing 24 is provided with a pair of gates 64, which are pivotally movable about hinge pins 66. An opening 68 (FIG. 1) between gates 64 is disposed for mounting (by means not shown) a welding wire feed guide 70 therein, which is used to feed welding wire 72 to welding electrode 48. When not used with a wire feed guide, opening 68 may be used as an observation port by an operator.

A rear wall 74 (FIG. 2) of housing 24 is of shorter length than side walls 82 and 84 and front gates 64, and to rear wall 74 is attached, as by welding, a gas guide 76. Gas guide 76 is constructed of thin (0.020") corrugated stainless steel having an arched configuration so that guide 76 may be bent by the operator to cover a variety of configurations of joints 14. A rear wall 78 of guide 76 is provided with a pivotally movable tailgate 80, which is connected to rear wall 78 of guide 76 by a hinge pin 82. Gas guide 76 is constructed so that a trailing region 86 enclosed under guide 76 is in communicating relation with interior 18 of housing 24. Side walls 83 and 85 of guide 76 and side walls 82 and 84 of housing 24 are partially constructed of stainless steel screen 88 having a tight mesh, which allows some shield gas to escape therethrough, continuously excluding atmospheric gases from within trailer shield assembly 10 while maintaining a slight positive pressure gradient between the interior of trailer shield 10 and atmospheric pressure outside trailer shield 10. Additionally, an operator may view the welding arc through screen 88 mounted to side walls 82 and 84 of housing 24.

Figure 3:
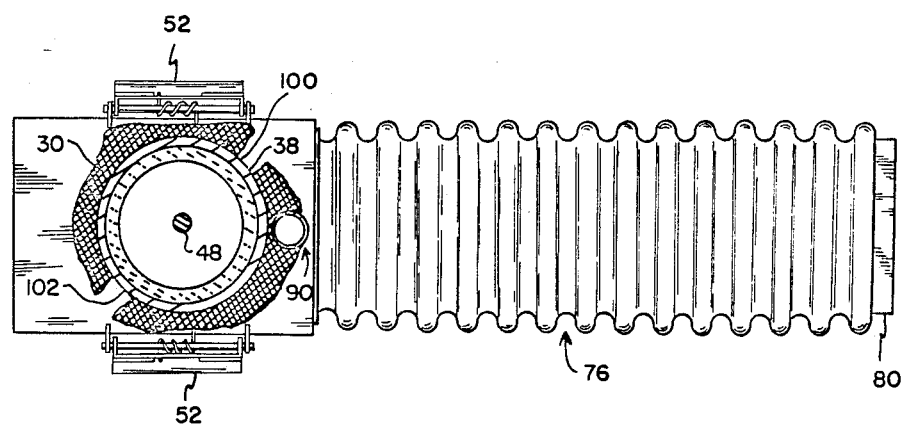
FIG. 3 is a top elevational view with portions broken away for clarity.

For providing an even distribution of shield gas to trailer shield assembly 10, in addition to shield gas provided by torch 12 to housing 24 via gas cup 42, a flexible shield gas manifold tube 90 is mounted as shown in FIG. 2. Tube 90 is mounted adjacent to rear wall 74 of housing 24 and extends through walls 74 to further extend the length of guide 76. Manifold tube 90 is fabricated of a soft, bendable metal, such as copper, and is provided with a plurality of spaced openings 92 in an upper side 94 through which shield gas is distributed to interior 86 of guide 76. A pair of opposed openings 96 (only one shown in FIG. 2) in a front portion 98 of manifold tube 90 communicates with upper gas manifold region 32 of housing 24. This allows a portion of the shield gas provided to tube 90 to be channeled around sides 100 and 102 (FIG. 3) of sleeve 38 to a portion 31 of aluminum diffuser mesh 30 which is positioned ahead of torch 12. Diffuser mesh 30 evenly distributes shield gas from upper gas manifold 32 to a region 106 ahead of torch 12 so that metal ahead of torch 12 which is preheated by the welding operation is covered by a layer of shield gas. Rear portion 108 of manifold tube 90 is mounted in an upper region 110 of guide 76 by brackets 111, and as stated, extends the length of guide 76. Portion 108 is surrounded by a steel wood diffuser 112, which in turn is supported by a corrugated stainless steel mesh 114 welded to interior side 116 of guide 76. Diffuser 112 evenly distributes additional shield gas (with respect to shield gas from torch 12) from openings 92 of manifold tube portion 94 to the interior 86 of guide 76.

In operation, a gas shielded welding torch 12 is sealably mounted in sleeve 38 (FIG. 2), with catch 54 of clips 52 engaging groove 58 of torch 12 to securely hold torch 12 in housing 24. If necessary, wire feed guide 70 is positioned in opening 68 of housing 24 to feed welding wire 72 to a point near welding electrode 48. Trailer shield assembly 10 is then positioned to closely cover a region 15 being welded and a trailing portion 16 of the weld which is still hot from the welding operation. Front gates 64 and tailgate 80 are movably constructed as described so they may lightly drag on the sections of metal being joined without introducing significant frictional drag or causing assembly 10 to catch on minor surface flaws thereon. Additionally, screen 88 of side walls 82 and 84 of housing 24 and screen 88 of sides 82 and 84 of guides 76 may, in some cases, be allowed to lightly drag in order to increase the positive pressure differential between interior 86 of assembly 10 and outside pressure. Shield gas manifold 90 (FIG. 2) is connected to a source 11 of argon shield gas, which is directed upwardly by openings 92 into steel wool diffuser 112 and from openings 96 to aluminum diffuser 30. From diffusers 112 and 30, argon diffuses downwardly in an even layer to cover joint 14 and to establish a slight positive pressure in interior 86 of trailer shield assembly 10 to continuously exclude atmospheric gases therefrom.

Figure 5:
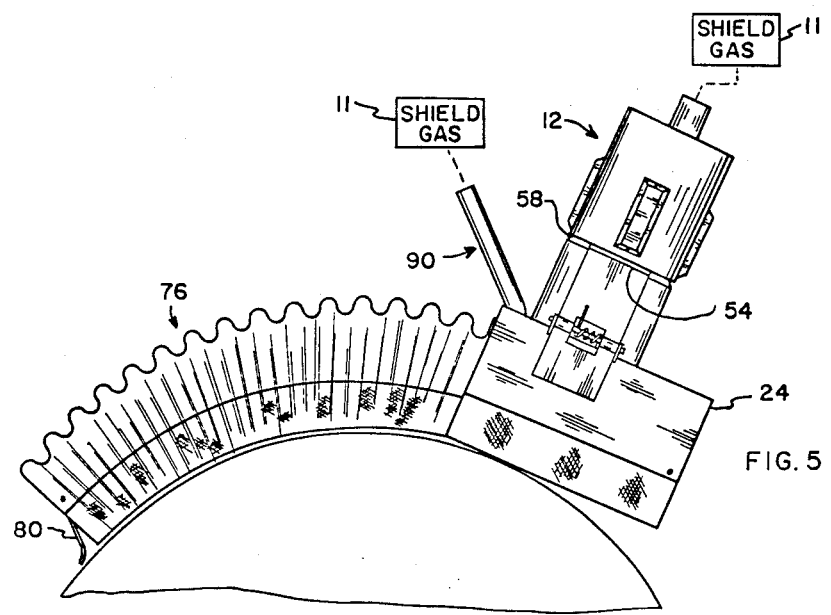
FIG. 5 is a pictorial view of an embodiment of the present invention showing a gas guide contoured to follow a cylindrical or spherical seam of welding metal.

When a joint to be welded is of a curved configuration, such as those present on pipes or spherical surfaces (FIG. 5) or those in a circular configuration (FIG. 6), gas guide 76 is bent by the operator so that guide 76 is generally maintained in longitudinal alignment with the hot weld as torch 12 is drawn over the metal to be joined.

From the foregoing, it is apparent that the applicant has provided a trailer shield assembly having a trailing gas guide which may be bent by the operator to conform to a variety of joint configurations to be welded and which protects all of the metal heated by the welding process from atmospheric gases.

What is claimed is:

1. A shield gas distributing apparatus for a welding torch comprising:
    a housing having front and rear walls, a pair of side walls, an upper wall, and a lower open region defined by said walls, said housing disposed to cover a workpiece to be welded;
    a welding torch having a welding tip portion and means for latchably and sealably mounting said torch rigidly in said housing so that said welding tip portion is disposed in said lower open region to engage said workpiece in welding relation therewith;
    a flexible gas guide enclosure having a rear end wall and being affixed at a front region to said rear wall of said housing and having an interior in communicating relation with an interior region of said housing;
    a tubular, flexible shield gas manifold coupled to a source of shield gas and extending from said housing lengthwise into an upper region of said gas guide, said shield gas manifold having a plurality of spaced, upwardly directed openings for providing shield gas into said interior of said gas guide, and at least one opening in said tubular shield gas manifold communicating with said interior region of said housing;
    a first diffuser in said gas guide and surrounding said shield gas manifold for receiving shield gas from said plurality of upwardly directed openings and diffusing shield gas downwardly over a welded portion of said workpiece; and
    a second diffuser mounted in said housing a spaced distance from said upper wall and adjacent said front wall, for receiving said shield gas from said one opening and diffusing same over a portion of said workpiece preheated by welding.

2. A shield gas distributing apparatus as set forth in claim 1 wherein said front wall of said housing is provided with an opening for receiving a welding wire feed guide.

3. A shield gas distributing apparatus as set forth in claim 2 wherein said means for latchably and sealably mounting said welding torch in said housing comprises;
    a spring biased latch mounted on each side of said housing, each latch having a catch portion positioned on one end thereof, and catch receiving means positioned on said welding torch for engaging said catch portion of each said latch;
    a sleeve set in an opening in said upper wall of said housing for receiving said welding torch in latched relation; and
    sealing means, including an O-ring, disposed in an inner surface of said sleeve, for sealing said welding torch in said housing.

4. A shield gas distributing apparatus as set forth in claim 1 wherein said front wall of said housing comprises a pair of spaced gates defining said opening therebetween, said pair of gates being pivotally disposed for upward movement, and wherein said rear end wall of said gas guide comprises a tailgate pivotally disposed for upward movement so that said pair of gates and said tailgate, when movably contacting metal of said workpiece, freely move thereacross.

5. An apparatus as set forth in claim 3 wherein said pair of side walls of said housing and sides of said gas guide include fine mesh screen for allowing controlled leakage therethrough of said shield gas, continuously excluding atmospheric gases from said interior region of said housing and said interior of said gas guide.

6. An apparatus as set forth in claim 5 wherein said flexible gas guide is of corrugated construction disposed for being configured to contoured welds.

* * * * *